May 11, 1937.   S. M. NAMPA   2,079,947
CAR LOADING MECHANISM
Filed Nov. 2, 1932   2 Sheets-Sheet 1

INVENTOR
Sulo Michael Nampa.
BY
Harness, Dickey, Pierce & Hann.
ATTORNEYS.

May 11, 1937.  S. M. NAMPA  2,079,947
CAR LOADING MECHANISM
Filed Nov. 2, 1932  2 Sheets-Sheet 2
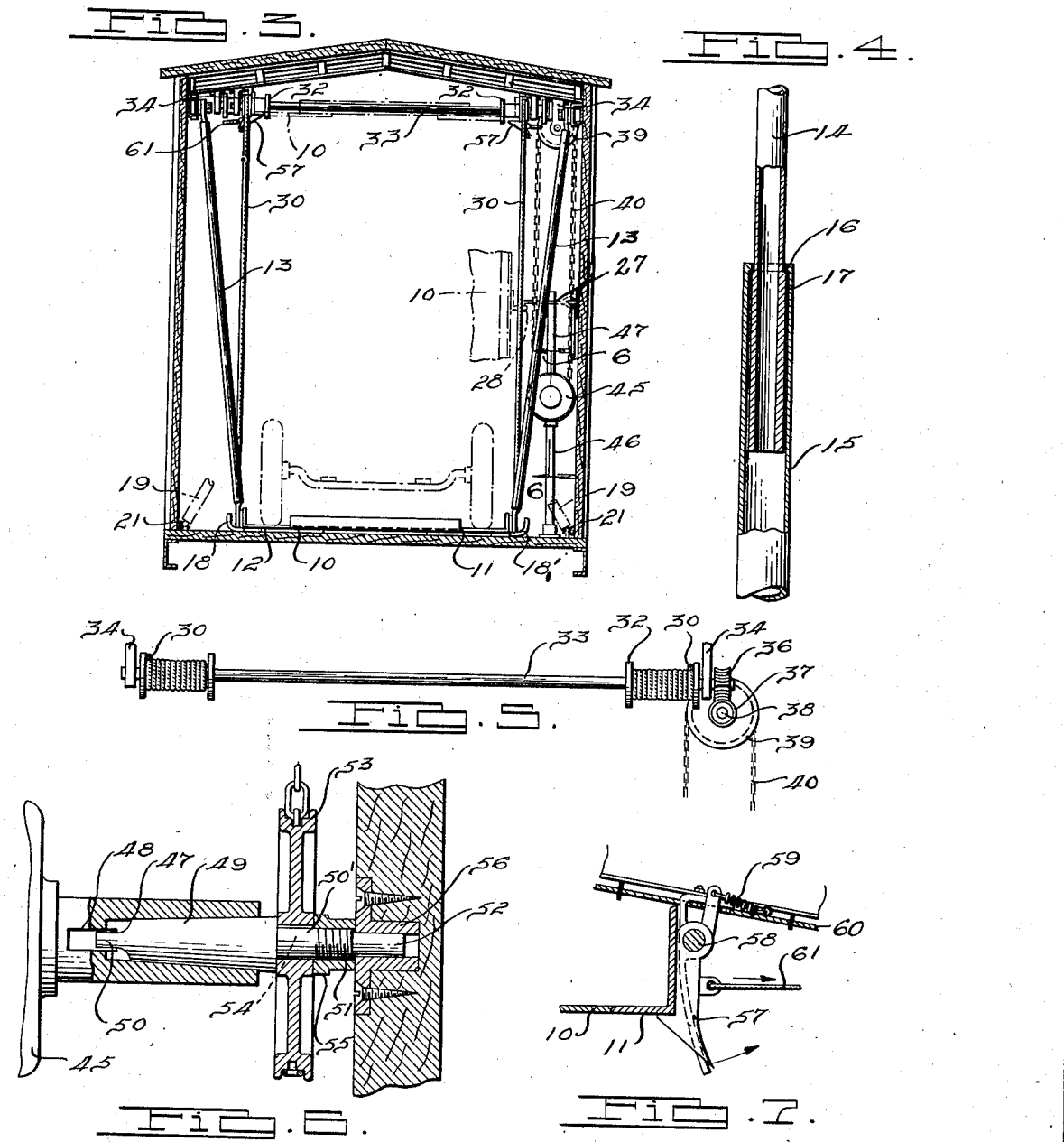
INVENTOR
Sulo Michael Nampa.
BY
Harness, Dickey, Pierce & Hann.
ATTORNEYS.

Patented May 11, 1937

2,079,947

UNITED STATES PATENT OFFICE 2,079,947

CAR LOADING MECHANISM

Sulo Michael Nampa, Detroit, Mich., assignor, by mesne assignments, to The Worth Company, a corporation of Michigan Application November 2, 1932, Serial No. 640,798

17 Claims. (Cl. 105—368)

The invention relates to loading mechanisms, and it has particular relation to a mechanism for loading and supporting automobiles in freight cars or the like for transportation purposes.

One object of the invention is to provide a loading mechanism for the purpose designated, by means of which an automobile may be quickly moved into and anchored in a semidecking position, with a minimum requirement of manual effort and with a minimum loss of time to the end that little expense will be involved in so positioning the automobile.

Another object of the invention is to provide a loading mechanism for the purpose designated, operable by power means which may be quickly released and removed from the car after serving the purpose of raising the automobile to its decked position.

Another object of the invention is to provide a mechanism of the last mentioned character, which may also be operated manually to the end that the operator may deck the automobile either with the power means or manually, depending upon circumstances.

Another object of the invention is to provide improved means for holding the loading mechanism in a position adjacent the roof of the car when the latter is to be used for other purposes.

Another object of the invention is to provide an efficient, light, and inexpensive power means adapted to be used for the purposes above set forth in connection with the decking of the automobile.

Another object of the invention is to provide a method of decking an automobile in a freight car or the like, which reduces the amount of labor and time required in the decking operation and minimizes the space required in the car for accommodating the loading mechanism.

Other objects of the invention will become apparent from the following description relating to a particular embodiment of the invention, and the claims hereinafter set forth.

For a better understanding of the invention, reference may be had to the accompanying drawings forming a part of the specification, wherein:

Figure 3 is a left end view of the construction illustrated by Fig. 2 with certain parts omitted for the purposes of clarity.

Figure 4 is a cross-sectional view on a larger scale, taken substantially along the line 4—4 of Fig. 1.

Figure 5 is a detail view on a larger scale, taken substantially along the line 5—5 of Fig. 1, and illustrating a part of the raising mechanism.

Figure 6 is a cross-sectional view on a larger scale, taken substantially along the line 6—6 of Fig. 3 and illustrating the construction of the transportable power means employed.

Figure 7 is a cross-sectional view on a larger scale, taken substantially along the line 7—7 of Fig. 1, and illustrating a latching mechanism for holding the automobile supporting means in its out-of-the-way position adjacent the roof of the car when it is not in use.

Figure 1:
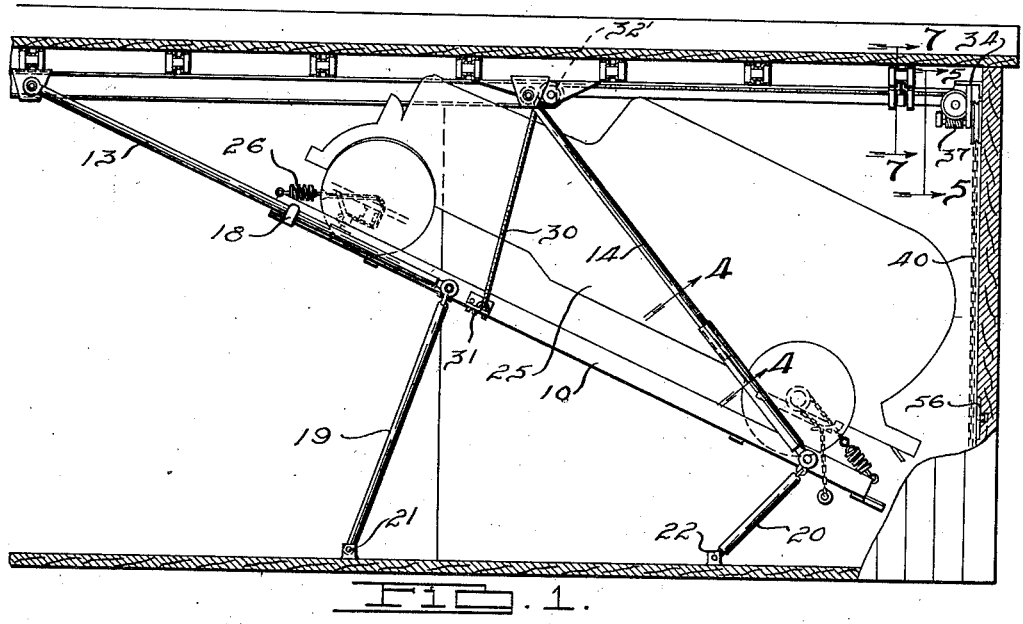
Figure 1 is a fragmentary longitudinal cross-sectional view of a freight car, illustrating a loading mechanism constructed according to one form of the invention, in its automobile-decking position.
Figure 2:
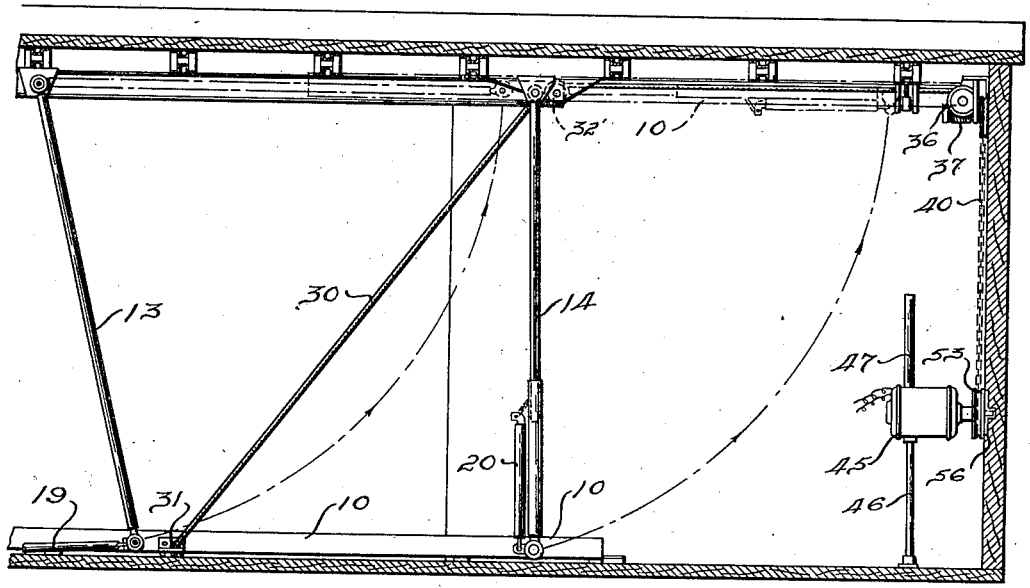
Figure 2 is a view, similar to Fig. 1, illustrating the loading mechanism in its position prior to decking of the automobile and also illustrating in broken lines, the position of the mechanism adjacent the roof of the car when it is not in use.

Referring to Figs. 1, 2 and 3, a rectangular metal frame 10 is provided, and at opposite sides, channel ways 11 and 12 are effected which constitute first, a runway for moving an automobile to a position upon the frame, and then a support for the wheels. The front part of the frame 10 is pivotally connected to upper and opposite sides of the car, by means of rods 13 and, as best shown by Fig. 3, these rods extend downwardly and inwardly in converging relation and are pivotally connected at their lower ends to opposite sides of the frame. The rear part of the frame similarly is pivotally connected to upper and opposite sides of the car by rods 14 having pivotal connection at their lower ends to the opposite sides of the frame. These rods, likewise, extend downwardly and inwardly in converging relation.

The parts are so arranged, that when the frame is resting on the floor as shown by Fig. 2, the rods 13 extend upwardly and slightly in a direction away from the end of the car whereas the rods 14 are disposed substantially in a vertical position. Now if the frame is moved upwardly and toward the end wall of the car to position it as shown by Fig. 1, the rods 13 and 14 both will fulcrum about their pivotal connections with the car and, owing to their different lengths and position, the frame finally will be in a semi-decking position and inclined to the vertical as shown by Fig. 1. To avoid binding in raising the frame to a position adjacent the roof, the rod 14, as shown by Fig. 4, may be of telescopic character and include a second member 15 pivotally connected to the frame 10, and which telescopically receives the lower end of the rod. For allowing the rod to support the frame and the load thereon, the upper end of the lower part 15 may have an inwardly directed flange 16 adapted to cooperate with a shoulder 17 on the lower end of rod 14. The telescopic character of the rods 14 is such that the frame 10 may be moved to its semi-decking position shown by Fig. 1, with the rods supporting the load, and then moved into a substantially horizontal position adjacent the roof of the car as shown in broken lines by Fig. 2.

For automatically moving the frame into the horizontal position adjacent the roof, the frame 10 adjacent its forward end, and on opposite sides, is provided with hook shape members 18, opening upwardly, and these are adapted to receive and engage intermediate portions of the rods 13 substantially when the frame is in its semi-decking position. With the automobile removed, it is apparent that upon raising the frame past its semi-decking position, the latter and rods 13 will act as a single rigid member pivoting about the pivots at the upper ends of the rods. During this upward movement, the rods 14 will telescope and in effect become shorter, and finally, the rods 13 and frame will swing into a horizontal position adjacent the roof, with the rods 14 also substantially horizontal. An application for patent filed in the name of Samuel D. Butterworth, Serial Number 646,830, filed December 12, 1932, embodies means of this character for automatically positioning the frame in a horizontal position adjacent the roof.

When the frame is in its semi-decking position with an automobile thereon, a front pair of thrust rods 19 and a rear pair of thrust rods 20 pivotally connected to opposite sides of the frame, and ordinarily carried thereby, are connected to lower and opposite sides of the car as indicated at 21 and 22, thus providing a firm undersupport for the frame. Each pair of these thrust rods preferably extend upwardly and inwardly in converging relation so as to counteract, in conjunction with the rods 13 and 14, side forces as well as longitudinal forces, tending to displace the automobile and frame during movement of the freight car. For additionally counteracting any possible side swaying of the frame and automobile, a hook 27 shown by Fig. 3 may be pivotally connected to a side wall of the car, and have a hook portion at its end adapted to engage an eye 28 which may be provided on the side of the frame. The automobile, indicated at 25, may be secured in the channels 11 and 12, by chain connecting devices 26 secured to opposite ends of each axle and to the front and rear ends of the frame.

The construction so far described illustrates how the automobile may be fastened to the frame 10, and the frame and automobile raised to the semi-decking position and secured in such position for transportation purposes. Also the construction described, illustrates how the frame may be disposed in an upper and out-of-the-way position adjacent the roof of the car when it is not in use. The following description will particularly relate to the means employed for moving the frame 10 and automobile to its semi-decking position, and the frame to a position adjacent the roof of the car when it is not to be used.

For raising the frame, flexible members such as steel cables 30 are secured at one end to opposite sides of the frame 10 respectively, as indicated at 31, and extend upwardly where they are trained over rollers 32' journaled in brackets secured to the roof of the car. The cables then extend toward the end wall of the car along the roof and at the upper edge of the end wall, they are wound around a pair of drums 32 secured to opposite ends of a shaft 33 that in turn is journaled in brackets 34 secured to the car at the upper edge of the end wall. The end of that portion of each cable wound around its respective drum, is positively secured to the drum at one point to prevent possible separation of the cable from the drum.

One end of the shaft has a worm wheel 36 secured thereto, which meshes with a worm 37 secured on a stub-shaft 38 also journaled in one of the brackets 34. The stub-shaft 38 also is provided with a sprocket wheel 39 and an endless chain 40 is trained about the sprocket wheel and extends downwardly along the end wall of the car to a point convenient for manipulation of the chain to turn the sprocket wheel and hence the shaft 33 carrying the drums. The worm and worm wheel connection are of such character that they lock the rotary parts against accidental rotation and it is necessary to move the chain 40 in one direction or the other in order to cause rotation of shaft 33.

It is now apparent that an operator, by manipulating the chain 40, may cause winding or unwinding of the cables 30 on the drums, thus raising the frame 10 or lowering it, as the case may be. The sprocket wheel in conjunction with the worm and worm wheel renders it possible to turn the shaft 33 by manually manipulating the chain 40 without an excessive force, even though the cables are raising the frame 10 with an automobile supported thereon. Preferably, the dimensions of each drum are such that in raising the frame 10 to its semi-decking position shown by Fig. 1, only one layer of convolutions of cable will be wound around each drum. During raising of the frame 10 with a heavy load thereon, this avoids winding of the cable 30 over the first layer of convolutions on the drum and prevents wear and tear on the cable which would undesirably occur if the heavily loaded cable began to wind about a first layer of convolutions. If the frame 10 is moved upwardly beyond its semi-decking position, which ordinarily can only occur when an automobile is not on the frame, a second layer of convolutions will be wound about the drum but, owing to the relatively small load on the cable, the wear and tear that might be caused by winding one convolution of cable over another, is practically negligible.

It is evident that a steel cable under load will wind on the drum in spiral fashion as the preceding convolution will guide the cable as it is wound and cause it to seat on the drum surface next to such convolution. When the winding cable approaches the flange at the end of the drum, the exposed drum surface will gradually become smaller and finally become too narrow for the cable and the second convolution then necessarily must begin. It is apparent that the beginning of this second convolution can well be predetermined so that considering both drums together, only one layer of convolutions will be wound around each drum during raising of the frame to its semi-decking position.

While manual manipulation of the chain 40 for the purpose of raising the frame is very effective, and an operator does not have to exert an excessive force, it will be appreciated that the sprocket wheel 39 will have to be rotated a large number of times in order to effect sufficient rotation of the shaft 33 to raise the frame. This requires some time and furthermore requires the operator to repeatedly exert the force required to pull the chain. In order to expedite raising of the frame, power means of transportable character are provided for moving the chain and thus turning the sprocket wheel 39. This power means is illustrated in Fig. 2, and comprises a motor frame 45 which may have arms 46 and 47 projecting from diametrically opposite sides thereof, and one of which preferably is adapted to rest on the floor of the freight car. These arms facilitate manual holding of the motor in position. The motor may constitute part of an electrical drill equipment in which, as shown by Fig. 6, the shaft of the motor has a tapered socket 47 and a slot 48 in the base of the socket.

The drill of the drill mechanism may also be employed and the tapered shaft portion of this drill is indicated at 49 and it will be noted that the drill has a reduced portion 50 at its inner end adapted to project into the slot 48 thus positively locking the shaft of the motor with the drill for simultaneous rotation. Instead of providing on the opposite end of the drill, a drill element which ordinarily is oppositely tapered, this oppositely tapered portion is turned down to provide a cylindrical portion 50' threaded at its outer end as indicated at 51, and a reduced pin portion 52. The cylindrical portion 50' is adapted to receive a sprocket wheel 53 which may be keyed thereto as indicated at 54 and for holding the sprocket wheel in position, a nut 55 may be threaded on the threaded portion 51 and against the wheel. The sprocket wheel 53 is adapted to fit between the sides of the chain 40 at the lower end of the latter and to rotate thus driving the chain and rotating the upper sprocket wheel 39. The pin portion 52 of reduced character, is adapted to fit into a metal pilot 56 fastened in the end wall of the car in such position that when the sprocket wheel is disposed in driving relation to the lower end of the chain, the pin fits into the pilot although it will be appreciated that the pin must rotate in the pilot. The pilot serves as a guide and centering means for the power means and greatly assists in the positioning thereof during its operation.

The motor, of course, operates at a fairly high rate of speed and, accordingly, very little time is required to revolve the chain sufficiently to raise the frame 10 to the position desired whether it be to the semi-decking position or to a position adjacent the roof of the car. The power means obviously can be readily separated from the chain and the car, thus avoiding carrying any equipment that would be in the way. Furthermore, one of the power means can be used for loading any number of freight cars, thus avoiding the use of power means in each car for each loading device.

When the frame is disposed against the roof of the car, it is desirable to support it in such position without depending on the chain so as to avoid possible breaking of the cables by jerking of the freight car back and forth and possible dropping of the frame and injury to a person who might be in the car. For accomplishing this result, latch members 57 may be pivoted, as indicated at 58, on supports secured to the roof of the car, and springs 59 may be used to normally urge the latch into positions where they will automatically engage the underside of the frame 10 when the latter is moved past them. These latches may be released by means of cables 60 and 61 extending respectively to the oppositely disposed latches, and the cables may be merged into one cable so that by pulling the latter, both latches may be released simultaneously. Preferably, the operating cable or cables will extend to a point adjacent the lower end of the chain 40 so that when it is desired to lower the frame, the operator may release the latches at the same time the chain is to be operated. After supporting the frame adjacent the roof of the car in this manner, the chain 40 may then be moved slightly to release any tension on the cables.

It will be appreciated from the foregoing description taken in conjunction with the drawings, that a very efficient as well as simple loading mechanism has been provided which may be used to quickly deck automobiles in a freight car. When the car is not used for automobile loading purposes, the frames, and usually there will be one at each end of the car, are disposed adjacent the roof and in out-of-the-way positions. When it is desired to deck an automobile in the car, it is only necessary to lower the frame to the floor and this may be accomplished very quickly by use of the power means or without requiring an excessive length of time, by manual manipulation of the chain. The automobile then may be rolled into the car and upon the frame and fastened thereto by means of the chain devices 26, and then by using the power means, the frame and automobile may be moved into a semi-decking position in a very short period of time. Furthermore, little labor is required to so deck the automobile and once it is decked, and secured in position by the means previously described; it will be maintained in such position against lateral and longitudinal forces that may be set up during movement of the freight car. It has been found in actual practice, that automobiles may be semi-decked in the manner described, in a far shorter period of time than by using any loading mechanism previously designed. This is extremely important, particularly at the present time when the railroad companies are having considerable difficulty in competing with the motor trucking industry for the business of transporting automobiles.

While the invention is particularly applicable to freight cars, it is evident that it is applicable in other instances, such as in motor conveyances and in stationary storage spaces or compartments. The term "freight car or the like" as used in the claims should not therefore be considered as limiting the invention to use in a freight car in view of such other applications of the invention as are and will become apparent.

Although only one form of the invention has been described and illustrated, it will be appreciated by those skilled in the art that various modifications may be made without departing from the scope of the claims.

I claim:

1. In combination with a freight car or the like, vertically movable means for supporting an object in the car, means connected to the car and first means for raising the latter, transportable power means, means for releasably and drivingly connecting the power means and raising means, and means on a wall of the car for anchoring the connection between the power means and raising means.

2. In combination with a freight car or the like, vertically movable means for supporting an object in the car, means connected to the car and first means for raising the latter, transportable power means including a driving shaft, means for releasably and drivingly connecting the power means and raising means, and means on a wall of the car for anchoring the connection between the power means and raising means and including a pilot for engaging the end of the shaft and holding it in axial position.

3. In combination with a freight car or the like, vertically movable means for supporting an object in the car, a hoist mounted in the upper part of the car and including a flexible member connected to the first means for raising the latter and an operating member extending downwardly to a manually available point, transportable power means, means for releasably and drivingly connecting the power means and operating member, and means on a wall of the car for anchoring the connection between the power means and operating member.

4. In combination with a freight car, vertically movable means for supporting an object in the car, means mounted in the upper part of the car and connected to the first means for raising the latter and including a flexible operating member of looped character extending downwardly, a sheave adapted to fit into the lower bight portion of the flexible member for operating the latter, power operated means drivingly connected to the sheave, and means on a wall of the car for anchoring the sheave in its operating position.

5. In combination with a freight car, vertically movable means for supporting an object in the car, means mounted in the upper part of the car and connected to the first means for raising the latter and including a flexible operating member of looped character extending downwardly, a sheave adapted to fit into the lower bight portion of the flexible member for operating the latter, and power operated means including a driven shaft, and pilot means on a wall of the car for releasably anchoring the end of the shaft and for holding the sheave in its operating position.

6. In combination with a freight car, vertically movable means for supporting an object in the car, means mounted in the upper part of the car and connected to the first means for raising the latter and including a flexible operating member of looped character extending downwardly, a sheave adapted to fit into the lower bight portion of the flexible member for operating the latter, and means on a wall of the car for rotatably anchoring the sheave in its operating position.

7. In combination with a freight car, vertically movable means for supporting an object in the car, means mounted in the upper part of the car and connected to the first means for raising the latter and including a flexible operating member of looped character extending downwardly, a sheave adapted to fit into the lower bight portion of the flexible member for operating the latter, means on a wall of the car for rotatably anchoring the sheave in its operating position, and a transportable motor having a releasable but driving connection with the sheave.

8. In combination with a freight car, vertically movable means for supporting an object in the car, hoisting means mounted in an upper part of the car and connected to the first means and including a flexible, looped operating member extending downwardly along a wall of the car, a transportable power device having a shaft and a power sheave on the shaft for fitting in and driving the lower bight portion of the flexible member, and means for releasably anchoring the device during use and including a pin projecting from the center of the sheave and a socket in the wall for releasably and rotatably receiving the pin.

9. The combination with a freight car or the like, of a frame adapted to support an automobile or the like, means for raising the frame and moving it into an inclined position, said means including a transversely extending shaft mounted on the car adjacent the roof, flexible means wound around the shaft at opposite ends thereof respectively and connected respectively to opposite sides of the frame, and means for rotating the shaft.

10. The combination with a freight car or the like, of a frame adapted to support an automobile or the like, means for raising the frame and moving it into an inclined position, said means including a transversely extending shaft mounted in the car adjacent the junction of the roof and end wall of the latter, flexible means wound around the shaft at opposite ends thereof respectively and connected respectively to opposite sides of the frame, and means for rotating the shaft.

11. The combination with a freight car or the like, of a frame adapted to support an automobile or the like, means for raising the frame and moving it into an inclined position, said means including a transversely extending shaft mounted on the car adjacent the roof, flexible means wound around the shaft at opposite ends thereof respectively and connected respectively to opposite sides of the frame, and means for rotating the shaft, said last mentioned means extending to a lower part of the car so as to be readily accessible for operation.

12. In combination, a freight car, a frame adapted to be raised, a transversely extending shaft mounted in an upper part of the car, flexible elements wound around opposite ends of the shaft and having loose ends connected respectively to opposed sides of the frame, and means for driving the shaft including a flexible element drivingly connected to the shaft and extending in looped form downwardly to a lower point in the car for manipulation purposes.

13. In combination, a freight car, a frame adapted to be raised, a transversely extending shaft mounted in an upper part of the car, flexible elements wound around opposite ends of the shaft and having loose ends connected respectively to opposed sides of the frame, a reduction gearing operatively connected to one end of the shaft, and a flexible element drivingly connected to the reduction gearing and extending in looped form downwardly to a lower point in the car for manipulation purposes.

14. In combination, a freight car, a frame adapted to be raised, a transversely extending shaft mounted in an upper part of the car, flexible elements wound around opposite ends of the shaft and having loose ends connected respectively to opposed sides of the frame, a reduction gearing operatively connected to one end of the shaft, a sheave operatively connected to the reduction gearing, and an endless flexible element trained around the sheave and extending in looped form downwardly to a lower point in the car for manipulation purposes.

15. In combination with a freight car, a frame adapted to support an automobile or the like, a hoist mounted in the car and including a drum, a flexible member wound around the drum and connected to the frame, means connecting the frame to the car and operating in conjunction with the hoist for raising the frame into a semi-decking position and for also positioning the frame adjacent the car roof for storage purposes, and means on the drum for causing the flexible member to initiate a second spiral winding over a first winding, the arrangement being such that a first winding of the member on the drum moves the frame to its semi-decking position before the second winding is initiated, whereby initiation of the second winding will not occur while an automobile is being lifted to the semi-decking position.

16. In combination with a freight car, a frame adapted to support an automobile, a hoist mounted in the car and including a shaft and a pair of drums on the shaft, flexible members wound about the drums respectively and having loose ends connected respectively to opposite sides of the frame, means connecting the frame to the car and operating in conjuction with the hoist for raising the frame to a semi-decking position and for also raising the frame beyond said position to a point adjacent the car roof, and means on the drums for causing the flexible members thereon to initiate a second winding over a first winding as the frame is lifted and to cause the second windings on both drums to be initiated substantially at the same time.

17. In combination with a freight car, a frame adapted to support an automobile, a hoist mounted in the car and including a shaft and a pair of drums on the shaft, flexible members wound about the drums respectively and having loose ends connected respectively to opposite sides of the frame, means connecting the frame to the car and operating in conjunction with the hoist for raising the frame to a semi-decking position and for also raising the frame beyond said position to a point adjacent the car roof, and means on the drums for causing the flexible members thereon to initiate a second winding over a first winding as the frame is lifted and to cause the second windings on both drums to be initiated substantially at the same time, the arrangement being such that the second windings are not initiated until the frame has been moved to its semi-decking position.

SULO MICHAEL NAMPA.